(12) United States Patent
Liang et al.

(10) Patent No.: US 11,248,446 B2
(45) Date of Patent: *Feb. 15, 2022

(54) USING ELECTROMAGNETIC WAVES TO REMOVE NEAR WELLBORE DAMAGES IN A HYDROCARBON RESERVOIR

(71) Applicant: Saudi Arabian Oil Company, Dhahran (SA)

(72) Inventors: Feng Liang, Cypress, TX (US); Jinhong Chen, Katy, TX (US); Rajesh Kumar Saini, Cypress, TX (US); Hui Hai Liu, Katy, TX (US)

(73) Assignee: Saudi Arabian Oil Company, Dhahran (SA)

(*) Notice: Subject to any disclaimer, the term of this patent is extended or adjusted under 35 U.S.C. 154(b) by 79 days.

This patent is subject to a terminal disclaimer.

(21) Appl. No.: 16/874,255

(22) Filed: May 14, 2020

(65) Prior Publication Data

US 2020/0270976 A1 Aug. 27, 2020

Related U.S. Application Data

(63) Continuation of application No. 15/926,666, filed on Mar. 20, 2018, now Pat. No. 10,669,829.

(51) Int. Cl.
*E21B 37/00* (2006.01)
*E21B 43/24* (2006.01)
(Continued)

(52) U.S. Cl.
CPC ............ *E21B 37/00* (2013.01); *C09K 8/50* (2013.01); *E21B 7/15* (2013.01); *E21B 43/14* (2013.01); *E21B 43/2401* (2013.01); *E21B 43/2405* (2013.01); *E21B 43/26* (2013.01); *E21B 47/13* (2020.05); *C09K 2208/10* (2013.01)

(58) Field of Classification Search
None
See application file for complete search history.

(56) References Cited

U.S. PATENT DOCUMENTS

2003/0209248 A1 11/2003 Berger et al.
2009/0242196 A1 10/2009 Pao
(Continued)

FOREIGN PATENT DOCUMENTS

WO 2012057910 5/2012
WO 2013155061 10/2013

OTHER PUBLICATIONS

Gulf Cooperation Council Examination Report issued in GCC Appln. No. GC 2019-37224, dated Sep. 23, 2020, 4 pages.
(Continued)

*Primary Examiner* — Anuradha Ahuja
(74) *Attorney, Agent, or Firm* — Fish & Richardson P.C.

(57) ABSTRACT

One method includes position an antenna inside a wellbore in a location corresponding to a formation where near wellbore damage occurs; wherein the wellbore extends from a surface of a hydrocarbon reservoir downward into the subterranean structure of the hydrocarbon reservoir; transmitting an electromagnetic (EM) wave to the antenna; and irradiating, from the antenna, at least a portion of the EM wave at the formation, wherein the portion of the EM wave removes the near wellbore damage at the formation.

11 Claims, 3 Drawing Sheets

(51) Int. Cl.
*E21B 43/14* (2006.01)
*E21B 7/15* (2006.01)
*E21B 43/26* (2006.01)
*C09K 8/50* (2006.01)
*E21B 47/13* (2012.01)

(56) References Cited

U.S. PATENT DOCUMENTS

| | | |
|---|---|---|
| 2009/0283257 A1 | 11/2009 | Becker |
| 2010/0263867 A1 | 10/2010 | Horton et al. |
| 2012/0018159 A1 | 1/2012 | Gupta et al. |
| 2012/0261129 A1 | 10/2012 | Becker |
| 2012/0318498 A1 | 12/2012 | Parsche |
| 2013/0213638 A1* | 8/2013 | Keller .................... C09K 8/467 166/248 |
| 2014/0027109 A1 | 1/2014 | Al-Buraik |
| 2014/0224472 A1* | 8/2014 | Parsche ............... E21B 43/2401 166/60 |
| 2015/0057097 A1 | 2/2015 | Cho |
| 2015/0167440 A1 | 6/2015 | Kasevich |
| 2015/0192005 A1 | 7/2015 | Saeedfar |
| 2015/0322759 A1* | 11/2015 | Okoniewski ........ E21B 43/2401 166/60 |

OTHER PUBLICATIONS

U.S. Appl. No. 15/243,312 filed Aug. 22, 2016, Chen.
International Search Report and Written Opinion issued in International Application No. PCT/US2019/021329 dated Jun. 11, 2019, 13 pages.
Gulf Cooperation Council Examination Report issued in GCC Application No. GC 2019-37224 dated Apr. 20, 2020, 3 pages.
George et al.; Approximate relationship between frequency-dependent skin depth resolved from geoelectromagnetic pedotransfer function and depth of investigation resolved from geoelectrical measurements: A case study of coastal formation, southern Nigeria; Oct. 2016; J. Earth Syst. Sci.; 1379-1390 (Year: 2016).

* cited by examiner

USING ELECTROMAGNETIC WAVES TO REMOVE NEAR WELLBORE DAMAGES IN A HYDROCARBON RESERVOIR

CROSS-REFERENCE TO RELATED PATENT APPLICATIONS

This application is a continuation of and claims the benefit of priority to U.S. patent application Ser. No. 15/926,666, filed Mar. 20, 2018, the contents of which are incorporated by reference herein.

TECHNICAL FIELD

This disclosure relates to removing near wellbore damages in a hydrocarbon reservoir, for example, using electromagnetic waves.

BACKGROUND

In some cases, productions of a hydrocarbon reservoir can be impacted by near wellbore damage. In the context of the oil and gas industry, a near-wellbore region refers to rock formations in the subterranean structure that are in the vicinity of the wellbore (for example, about a few centimeters from the rock surface of the bore-hole wall). Near-wellbore damage refers to flow restrictions caused by the reduction of permeability in the near-wellbore region during drilling, completion, or workover operations. Near-wellbore damage can significantly affect productivity of the well.

In wellbore drilling operations, a drilling fluid is flowed from a surface through a drill string and into a drill bit drilling the rock formation. The drilling fluid flows through the drill bit and returns to the surface through an annulus formed between the borehole wall and the drill string. The drilling fluid is also referred to as the drilling mud or the mud.

SUMMARY

The present disclosure describes methods and systems for removing near wellbore damage in a hydrocarbon reservoir. One method includes positioning an antenna inside a wellbore in a location corresponding to a formation where near wellbore damage occurs, wherein the wellbore extends from a surface of a hydrocarbon reservoir downward into the hydrocarbon reservoir; transmitting an electromagnetic (EM) wave to the antenna; and irradiating, from the antenna, at least a portion of the EM wave at the formation, wherein the portion of the EM wave removes the near wellbore damage at the formation.

Other implementations of this aspect include corresponding systems and apparatuses.

The details of one or more implementations of the subject matter of this disclosure are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
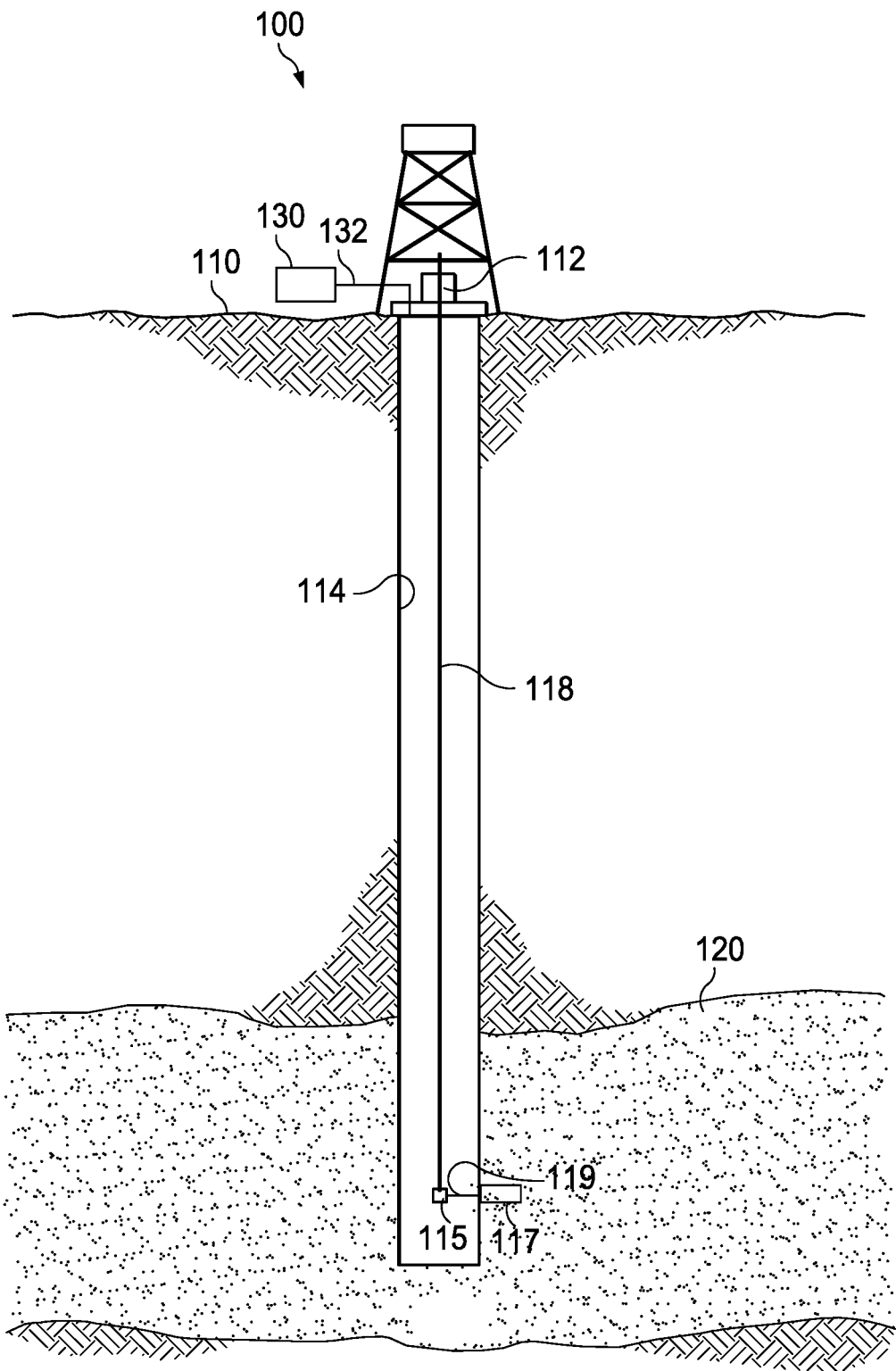
FIG. 1 is a schematic diagram that illustrates an example well system, according to an implementation.

This disclosure generally describes methods and systems for removing near wellbore damage in a hydrocarbon reservoir. The near-wellbore damage can occur in many situations. In one example, the near-wellbore damage can be caused by incomplete removal of filter cake formed from drilling muds. During drilling operations, filter cake is formed on the surface of the wellbore to reduce the fluid loss. The filter cake is removed after the drilling operation and before the cementing operation. Sometimes, fluid or surfactant solution may be needed to remove the filter cake. If there is a permeable region near wellbore, the fluid may flow to that region, and some portions of the filter cake may stay in that region. Due to ineffective removal of the filter cake, the effectiveness of the cementing operation of the well may also be impacted. An ineffective seal between rock formation and the cement may result in gas or fluid migration.

In another example, the near-wellbore damage can be caused by skin damage or near wellbore plugging from stimulation fluid in open-hole horizontal completions. In some operations, fracturing operations are performed in a horizontal open hole and uncemented liner completions. Filter cake may form during the fluid leakoff to the formation. In certain cases, the polymer concentration of the filter cake will reach to 300-400 pounds per a thousand gallons of fluids (pptg). These filter cakes may be difficult to remove.

In some implementations, electromagnetic (EM) waves can be used to facilitate the removal of near wellbore damage. For example, EM waves can be directed to the area of near-wellbore damaged zones and remove the near wellbore damage by irradiating on the formation in that area.

In one example, EM waves can be used to remove filter cakes by degrading the polymeric components in the filter cakes due to the heats generated by the EM waves. In one scenario, oil based muds with water internal phase can be heated to create pressure inside the filter cake. As a result, filter cake may fall in the wellbore and may be removed from the wellbore. Water-based filter cakes can be heated and the pressure created by sudden water expansion can facilitate the detachment of filter cake from formation. This technique may mitigate near wellbore damage caused by incomplete filter cake removal.

In another example, EM waves can also be used to remove the skin damage caused by fluid in a near wellbore region. In addition, EM waves can remove and damage caused by fines migration by creating new fractures and thus increasing permeability in the near wellbore region.

The EM waves can also help break the emulsion by locally heating the water molecule in the near wellbore region. In some cases, EM waves can help break the surfactant molecules that are stabilizing the emulsion. EM waves can also break natural surfactants from produced oil that stabilize the emulsion. EM waves can be used to accelerate or trigger the degradation of the polymeric based diversion materials removal.

In some implementations, EM waves can be used to fracture the rock formations in a subterranean structure. To fracture rock formations, EM waves having low frequencies are used to provide deep penetrations into the rock formation towards a wide area. Examples of EM waves used to fracture rocks include radio waves that have a frequency between 500 kilohertz (KHz) to 5 megahertz (MHz). In addition, EM waves used to fracture the rock formations have high power, for example, in the order of millions of watts. On the other hand, EM waves used to remove near wellbore damage are directed to a target damaged zone in a near wellbore region. Thus, the EM waves used to remove wellbore damage have a higher frequency than the EM waves used to fracture the rocks. Examples of EM waves used to remove near wellbore damages include microwaves that have a frequency between 300 megahertz (MHz) to 300 gigahertz (GHz). In addition, the EM waves used to remove near wellbore damages have a lower power than the EM waves used to fracture the rock. For example, the power of EM waves used to remove near wellbore damage can be in the order of thousands of watts.

FIG. 1 is a schematic diagram that illustrate example well system 100, according to an implementation. The example well system 100 transmits EM waves to remove near wellbore damage.

The example well system 100 includes a wellbore 114 that extends below the terranean surface 110, and into reservoir formation 120. The reservoir formation 120 can span a single formation, portions of a formation, or multiple formations.

Figure 2:
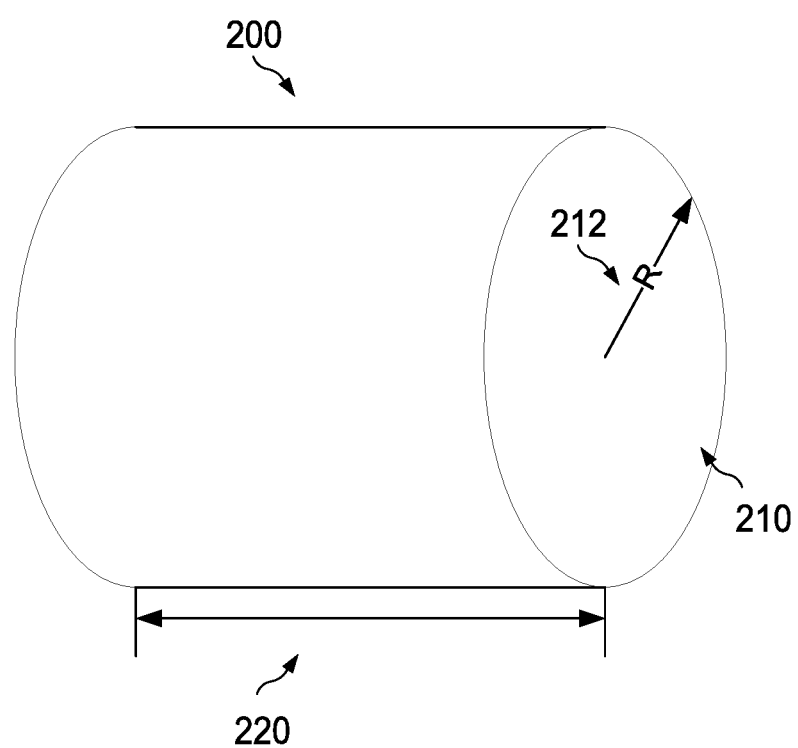
FIG. 2 is a schematic diagram that illustrates an example treatment zone, according to an implementation.

The well system 100 includes an EM wave transmitter 112. The EM wave transmitter 112 can be implemented as one or more hardware circuit elements, software, or a combination thereof that can be configured to generate an EM wave. In some implementations, an EM wave transmitter, for example, the EM wave transmitter 112, can include a power supply, an oscillator, a modulator, a power amplifier, or any combinations thereof, that can be configured to generate EM waves to irradiate the rock formation. In some implementations, the transmitter can include a synthesized radio frequency (RF) signal generator, a free running RF signal generator, or a combination thereof The well system 100 also includes an antenna 115 that irradiates EM waves. The frequency of the EM waves can be determined based on the electric property and thickness of the damaged zone. The antenna 115 is positioned in the wellbore 114 and close to the location where near wellbore damage occurs. In the illustrated example, the treatment zone 117 represents the area where the near wellbore damage occurs. The near well bore damaged zone can be located using production logs. The antenna 115 is configured to irradiate EM waves 119 directly at the treatment zone 117, to remove the near wellbore damage. In some cases, the antenna 115, and the frequency and duration of the EM wave 119, can be determined based on the size of the treatment zone 117. FIG. 2 and associated descriptions provide additional details of these implementations.

The well system 100 also includes a transmission line 118 that is coupled with the EM wave transmitter 112 and the antenna 115. The transmission line can be configured to direct the EM wave generated by the EM wave transmitter 112 to the antenna 115. The transmission line 118 can be implemented using a coaxial cable, a twisted pair wire, or a waveguide. In some implementations, a waveguide can be implemented using hollow conductive metal pipes to direct the EM waves.

The well system 100 also includes a pump 130 that is connected with a pipe 132. Prior to the EM wave irradiation, the pump 130 pumps treatment fluid into the wellbore 114 using the pipe 132. The treatment fluid flows to the treatment zone 117. The treatment fluid includes mixture of particles that are used to change the dielectric property of the treatment zone 117, and thus control the penetration depth of the EM wave 119. FIG. 2 and associated descriptions provide additional details of these implementations. In some cases, the pump 130 can be the mud pump that is used to pump drilling fluid in the well system 100, and the pipe 132 can be the pipe that transports drilling fluid in the well system 100.

In operation, the EM wave transmitter 112 generates EM waves. The EM waves can travel through the transmission line 118 to the antenna 115. The antenna 115 irradiates EM waves to the treatment zone 117. The irradiation raises the temperature in the treatment zone 117 and removes near wellbore damages in the treatment zone 117.

In some cases, as illustrated in FIG. 1, the EM wave transmitter 112 can be positioned at the surface. Alternatively or in combination, the EM wave transmitter 112 can be positioned inside the wellbore 114. For example, the EM wave transmitter 112 can be positioned next to the antenna 115, inside the wellbore 114. In some cases, a case can be used to protect the EM wave transmitter 112, the transmission line 118, the antenna 115, or any combinations thereof. The case can be implemented using a ceramic conduit. In some cases, a cable can be used to retrieve the case, the EM wave transmitter 112, the antenna 115, or any combinations thereof, to reuse these components to remove near wellbore damage in a different area of the wellbore 114 or other wellbores.

In one experiment, a core sample of sandstone rock sample having 1.5 inches in diameter and 6 inches in length was used as a sample treatment zone. The initial permeability measured with 2% KCl was determined to be 11.76 millidarcy (mD). After injection of 20 pptg guar fluid (in 2% KCl) to simulating production operations, the permeability was reduced to 0.51 mD (permeability regain was 4.3%), indicating the damage occurred. In a first microwave treatment, the sample is placed in a 1000 kilowatts (kW) microwave radiation for 2 minutes. The temperature of the sample is raised to 200 degrees Fahrenheit (F). The permeability was measured to be 2.86 mD, indicating a permeability regain of 24.3%. In a second microwave treatment, the sample is placed in a 1000 kilowatts (kW) microwave radiation for 3 minutes and 50 seconds. The temperature of the sample is raised to 300 degrees Fahrenheit (F). The permeability is measured at 6.37 mD, indicating a permeability regain of 54.1%. In a third microwave treatment, the sample was placed in a 1000 kilowatts (kW) microwave radiation for 6 minutes. The temperature of the surface of the sample was raised to approximately 400 to 500 degrees Fahrenheit (F). The permeability is measured at 8.50 mD, indicating a permeability regain of 72.2%. This experiment illustrates that near-wellbore damage can be removed by using microwave irradiation in the order of minutes.

The size of treatment zone targeted by the EM waves can be determined based on the transmitting antenna, frequency of the EM waves, and the electromagnetic property of the treatment zone. FIG. 2 is a schematic diagram that illustrates an example treatment zone 200 targeted by the EM waves, according to an implementation. The treatment zone 200 has a base area 210 and a penetration depth 220. The base area 210 has a radius 212. The size of the base area 210 of the treatment zone 200 can be determined based on the aperture of the antenna. The radius 212 approximates the aperture of the antenna. Therefore, antennae with different sizes can be selected based on the target base area of the treatment zone 200. The penetration depth 220 depends on the frequency of the EM wave and the electromagnetic property of the treatment zone. Equation (1) represents an example calculation of the penetration depth:

$$D = \frac{1}{\omega\sqrt{\frac{\mu_0 \varepsilon'}{2}\left[\sqrt{1 + \left(\frac{\omega\varepsilon'' + \sigma}{\omega\varepsilon'}\right)^2} - 1\right]}} \quad (1)$$

where D represents the penetration depth 220, $\mu_0 = 4\pi \times 10^{-7}$ H/m, $\omega$ is the frequency of the EM wave, $\varepsilon'$, $\varepsilon''$, and $\sigma$ represent the dielectric constant, dielectric loss, and the conductivity of the formation in the treatment zone, respectively. $\varepsilon'$, $\varepsilon''$, and $\sigma$ can be estimated or measured using rock samples in the treatment zone. These parameters can also be adjusted by adding materials with known $\varepsilon'$, $\varepsilon''$, and $\sigma$ into the formation.

The size of the target treatment zone can be set based on the size of the drilled well, data in the production logs, or a combination thereof. For example, the radius of the zone can be set to be about the same as the drilled well. The thickness of the zone can be set to a few centimeters from the rock surface of the borehole wall.

For example, particles composed of elements having specific dielectric and conductivity properties can be introduced into the treatment zone. Examples of these particles include metal oxides nanoparticles or other nanoparticles that include paramagnetic components. In one example implementation, these particles can be nanoparticles that are mixed in treatment fluid. The treatment fluid can be a mixture of water, proppants (for example, sand or other proppants), and chemicals. The treatment fluid can flow to the treatment zone prior to EM wave treatments. The nanoparticles mix with the formation, and therefore increase the penetration depth. The type of nanoparticles, and the concentration level of nanoparticles in the treatment fluid, can be determined based on the target penetration depth that the EM treatment intends to reach, and the dielectric and conductivity of the nanoparticles. The concentration of the particles can be determined based on the average conductivity or dielectric loss of the materials and the target electrical conductivity or the target dielectric property after the treatment. For example, the treatment fluid can have a high concentration of the particles if the average conductivity of the materials is low and thus the difference between the average conductivity and target conductivity is high. In another example, micro particles can be used instead of nanoparticles.

In some cases, the irradiation power of the EM waves can be controlled based on target temperature of the treatment zone. Equation (2) represents an example calculation of w:

$$w = \sigma E^2 + \omega\varepsilon'' E^2 \quad (2)$$

where w represents energy density converted from EM wave in the damaged zone, where E represents the strength of the electric field of the EM wave, $\omega$ is the frequency of the EM wave, $\varepsilon''$ and $\sigma$ represent the dielectric loss and the conductivity of the formation in the treatment zone, respectively. These parameters can also be adjusted by adding materials with known $\varepsilon''$ and $\sigma$ into the formation. For example, particles composed of elements having large conductivity, large dielectric loss, or a combination thereof can be introduced into the treatment zone. Examples of these particles include metal oxides nanoparticles or other nanoparticles that include paramagnetic components. These particles can be introduced into the treatment zone by mixing with treatment fluid as discussed previously.

The irradiation power of the EM waves depends on the volume of the zone of treatment zone, as shown in Equation (3):

$$p = cV\rho\Delta T/t \quad (3)$$

where p represents the power of the EM waves, c is the specific heat, V is the volume of the treatment zone, $\rho$ is the density of the formation in the treatment zone, $\Delta T$ is the temperature change targeted for treatment, t is treatment time. In one example, for a treatment zone having a volume of 0.05 m$^3$ (area=10 m$^2$ and depth=5 mm), to raise temperature by 200 K in an hour, the power input of the EM wave is set to 7 kW, where parameter c=10$^3$ J/kg/K, $\rho$=2.5×10$^3$ kg/m$^3$, $\Delta T$=200 K.

Figure 3:
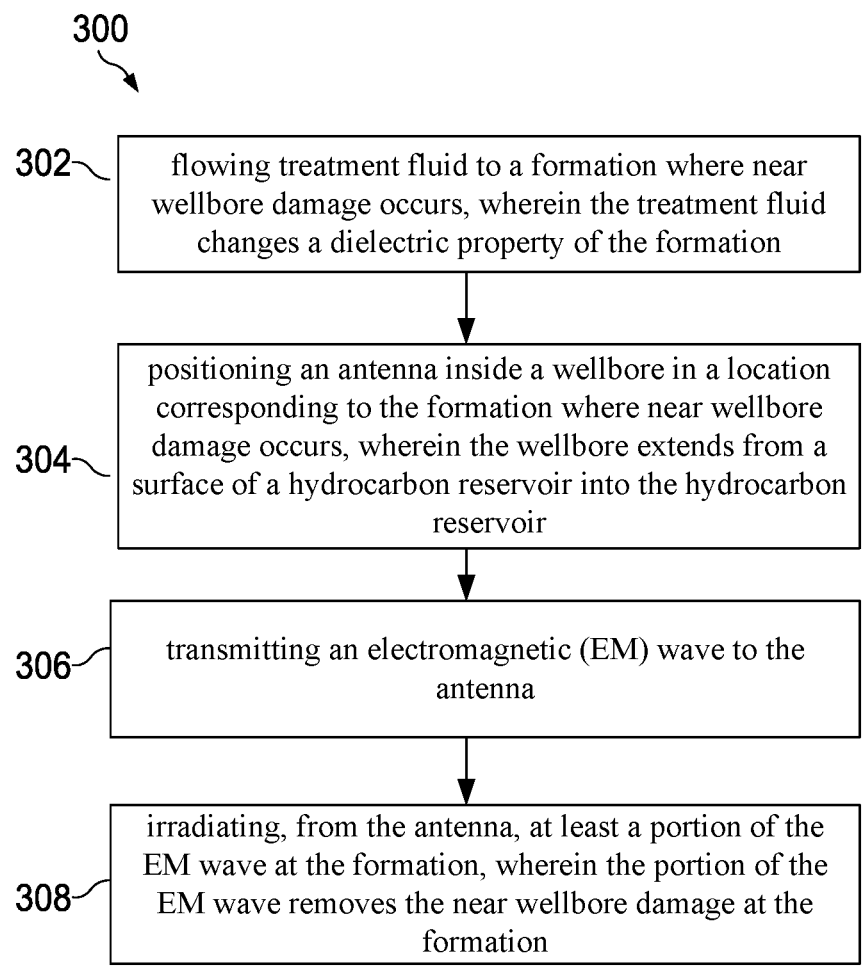
FIG. 3 illustrates an example method for removing near wellbore damage according to an implementation.

FIG. 3 illustrates an example method 300 for removing near wellbore damage using EM waves, according to an implementation. For clarity of presentation, the description that follows generally describes method 300 in the context of FIGS. 1-2.

At 302, treatment fluid is flown to a formation where near wellbore damage occurs. The treatment fluid changes a dielectric property of the formation. At 304, an antenna is positioned inside a wellbore in a location corresponding to the formation. The wellbore extends from a surface of a hydrocarbon reservoir into the hydrocarbon reservoir. At 306, an electromagnetic (EM) wave is transmitted to the antenna. At 308, at least a portion of the EM wave is irradiated from the antenna to the formation. The portion of the EM wave removes the near wellbore damage at the formation.

Described implementations of the subject matter can include one or more features, alone or in combination.

For example, in a first implementation, a method includes positioning an antenna inside a wellbore in a location corresponding to a formation where near wellbore damage occurs, wherein the wellbore extends from a surface of a hydrocarbon reservoir into the hydrocarbon reservoir; transmitting an electromagnetic (EM) wave to the antenna; and irradiating, from the antenna, at least a portion of the EM wave at the formation, wherein the portion of the EM wave removes the near wellbore damage at the formation.

The foregoing and other implementations can each, optionally, include one or more of the following features, alone or in combination:

A first aspect, combinable with the general implementation, where the near wellbore damage is caused at least in part by a filter cake, and wherein the portion of the EM wave removes the near wellbore damage by breaking the filter cake.

A second aspect, combinable with any of the previous or following aspects, where the near wellbore damage comprises skin damage, and wherein the portion of the EM wave removes the near wellbore damage by removing the skin damage.

A third aspect, combinable with any of the previous or following aspects, where the EM wave is a microwave.

A fourth aspect, combinable with any of the previous or following aspects, further comprising: determining a duration of the irradiating based on a target temperature of the formation being irradiated.

A fifth aspect, combinable with any of the previous or following aspects, further comprising: prior to the irradiating, flowing treatment fluid to the formation where near wellbore damage occurs, wherein the treatment fluid changes at least one of an electrical conductivity or a dielectric property of the formation.

A sixth aspect, combinable with any of the previous aspects, further comprising: mixing particles with the treatment fluid, wherein the particles are selected based on at least one of a target electrical conductivity or a target dielectric property.

A seventh aspect, combinable with any of the previous or following aspects, where the particles are metal oxides nanoparticles.

An eighth aspect, combinable with any of the previous or following aspects, further comprising: mixing particles with the treatment fluid, wherein the particles are selected based on a target power level of the EM wave.

A ninth aspect, combinable with any of the previous aspects, further comprising: determining a treatment zone of the EM wave; and selecting the antenna based on an aperture of the antenna and a based area of the treatment zone.

A tenth aspect, combinable with any of the previous or following aspects, further comprising: positioning an EM wave transmitter at a surface of the hydrocarbon reservoir; and generating the EM wave using the EM wave transmitter.

An eleventh aspect, combinable with any of the previous aspects, further comprising: positioning an EM wave transmitter in the wellbore, wherein the EM wave transmitter is enclosed in a protective case; and generating the EM wave using the EM wave transmitter.

In a second implementation, a method includes positioning an antenna inside a wellbore in a location corresponding to a formation where near wellbore damage occurs, wherein the wellbore extends from a surface of a hydrocarbon reservoir downward into the hydrocarbon reservoir; flowing treatment fluid to the formation where near wellbore damage occurs, wherein the treatment fluid changes at least one of an electrical conductivity or a dielectric property of the formation; after flowing the treatment fluid, transmitting an electromagnetic (EM) wave to the antenna; and irradiating, from the antenna, at least a portion of the EM wave at the formation, wherein the portion of the EM wave removes the near wellbore damage at the formation.

The foregoing and other implementations can each, optionally, include one or more of the following features, alone or in combination:

A first aspect, combinable with the general implementation, where the near wellbore damage is caused at least in part by a filter cake, and wherein the portion of the EM wave removes the near wellbore damage by breaking the filter cake.

A second aspect, combinable with any of the previous or following aspects, where the near wellbore damage comprises skin damage, and wherein the portion of the EM wave removes the near wellbore damage by removing the skin damage.

A third aspect, combinable with any of the previous or following aspects, where the EM wave is a microwave.

A fourth aspect, combinable with any of the previous or following aspects, further comprising: determining a duration of the irradiating based on a target temperature of the formation being irradiated.

A fifth aspect, combinable with any of the previous or following aspects, further comprising: mixing particles with the treatment fluid, wherein the particles are selected based on at least one of a target electrical conductivity or a target dielectric property.

A sixth aspect, combinable with any of the previous or following aspects, where the particles are metal oxides nanoparticles.

A seventh aspect, combinable with any of the previous or following aspects, further comprising: mixing particles with the treatment fluid, wherein the particles are selected based on a target power level of the EM wave.

This description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Accordingly, the previous description of example implementations does not define or constrain this disclosure. Other changes, substitutions, and alterations are also possible without departing from the spirit and scope of this disclosure.

What is claimed is:

1. A method, comprising:
   positioning an antenna inside a wellbore in a location corresponding to a formation comprising near-wellbore damage, wherein the wellbore extends from a surface of a hydrocarbon reservoir into the hydrocarbon reservoir;
   determining an irradiation power level of an electromagnetic (EM) wave based on at least a volume of a treatment zone, a density of the formation in the treatment zone, a target temperature change, and a treatment duration;
   determining an energy density converted from the EM wave based on the following equation:

$$w = \sigma E^2 + \omega \varepsilon'' E^2$$

where w represents the energy density converted from the EM wave, E represents a strength of an electric field of the EM wave, $\omega$ is a frequency of the EM wave, $\varepsilon''$ represents a dielectric loss of the formation in the treatment zone, and a represents a conductivity of the formation in the treatment zone;
   determining a penetration depth of the treatment zone by the EM wave based on the following equation:

$$D = \frac{1}{\omega \sqrt{\frac{\mu_0 \varepsilon'}{2} \left[ \sqrt{1 + \left(\frac{\omega \varepsilon'' + \sigma}{\omega \varepsilon'}\right)^2} - 1 \right]}}$$

where D represents the penetration depth, $\mu_0 = 4\pi \times 10^{-7}$ H/m, $\varepsilon'$ represents a dielectric constant of the formation in the treatment zone;
   transmitting the EM wave to the antenna;
   irradiating, from the antenna, a portion of the EM wave with the determined irradiation power level, the determined energy density, and the determined penetration depth, at the formation; and
   removing the near-wellbore damage at the formation with the portion of the EM wave.

2. The method of claim 1, wherein the near-wellbore damage is caused at least in part by a filter cake, and wherein the portion of the EM wave removes the near-wellbore damage by breaking the filter cake.

3. The method of claim 1, wherein the near-wellbore damage comprises skin damage, and wherein the portion of the EM wave removes the near-wellbore damage by removing the skin damage.

4. The method of claim 1, wherein the EM wave is a microwave.

5. The method of claim 1, further comprising: prior to the irradiating, flowing treatment fluid to the formation where near-wellbore damage occurs, wherein the treatment fluid changes at least one of an electrical conductivity or a dielectric property of the formation.

6. The method of claim 5, further comprising: mixing particles with the treatment fluid, wherein the particles are selected based on at least one of a target electrical conductivity or a target dielectric property.

7. The method of claim 6, wherein the particles are metal oxides nanoparticles.

8. The method of claim 5, further comprising: mixing particles with the treatment fluid, wherein the particles are selected based on the power level of the EM wave.

9. The method of claim 1, further comprising:
selecting the antenna based on an aperture of the antenna and a base area of the treatment zone.

10. The method of claim 1, further comprising:
positioning an EM wave transmitter at a surface of the hydrocarbon reservoir; and
generating the EM wave using the EM wave transmitter.

11. The method of claim 1, further comprising:
positioning an EM wave transmitter in the wellbore, wherein the EM wave transmitter is enclosed in a protective case; and
generating the EM wave using the EM wave transmitter.

* * * * *

UNITED STATES PATENT AND TRADEMARK OFFICE
CERTIFICATE OF CORRECTION

PATENT NO. : 11,248,446 B2
APPLICATION NO. : 16/874255
DATED : February 15, 2022
INVENTOR(S) : Liang et al.

It is certified that error appears in the above-identified patent and that said Letters Patent is hereby corrected as shown below:

In the Claims

Column 8, Line 43 (approx.), Claim 1, delete "a" and insert -- $\sigma$ --.

Signed and Sealed this
Nineteenth Day of July, 2022

Katherine Kelly Vidal
*Director of the United States Patent and Trademark Office*